Feb. 7, 1933.　　　G. M. CROSS　　　1,896,539
SHOCK ABSORBER
Filed Feb. 12, 1930　　2 Sheets-Sheet 1

INVENTOR.
Grosvenor M. Cross.

Feb. 7, 1933.   G. M. CROSS   1,896,539
SHOCK ABSORBER
Filed Feb. 12, 1930   2 Sheets-Sheet 2

INVENTOR.
Grosvenor M. Cross.

Patented Feb. 7, 1933

1,896,539

UNITED STATES PATENT OFFICE

GROSVENOR M. CROSS, OF NEWTON, MASSACHUSETTS

SHOCK ABSORBER

Application filed February 12, 1930. Serial No. 427,831.

This invention relates to devices for neutralizing the reaction of springs, termed broadly shock absorbers, of the type which allow the body and axles of the vehicle to which they are attached free movement away from a normal degree of separation, but oppose their return movement thereto.

In one aspect my invention consists in an improved device of this character which is constructed to allow such free movement in both directions from a position of normal or initial separation, and to check the return to normal position from both directions with a non-frictional force at all times substantially proportional to the amount by which such separation is greater or less than normal. My improved device is so constructed that the forces exerted in its operation are substantially unaffected by the different velocities of movement between body and axle. My invention also contemplates the provision of automatic means for shifting the normal position of the neutralizer in accordance with changes in the normal relative position of body and axle, due to changes in load.

An important feature of my invention consists in a neutralizer organized to include two separate functional units, an actuating or power unit, comprising a fluid-filled chamber mounted on one of the body or axle members, with a piston journaled therein and connected to the other body or axle member through suitable linkage, and a controlling or pressure unit whose action determines the fluid pressures of the device. The piston divides the chamber into two portions, whose volume varies as the vehicle body and axle are brought nearer together or farther apart; hence, as this takes place fluid must flow from one portion to the other. This flow takes place through a second chamber, connected at each end to one portion of the first. The second chamber contains the controlling unit, which is comprised of three elements, these being, (1) a piston closing the chamber and hence traveling back and forth therein as the fluid flows back and forth; (2) spring means connected at one end to the piston and hence deflected as the piston moves back and forth in the chamber; and (3) a valve assembly attached to the other end of the spring means, and interposed in the controlling chamber, and hence governing the flow therethrough and thus the movement of the main piston, and the body and axle.

Figure 1:
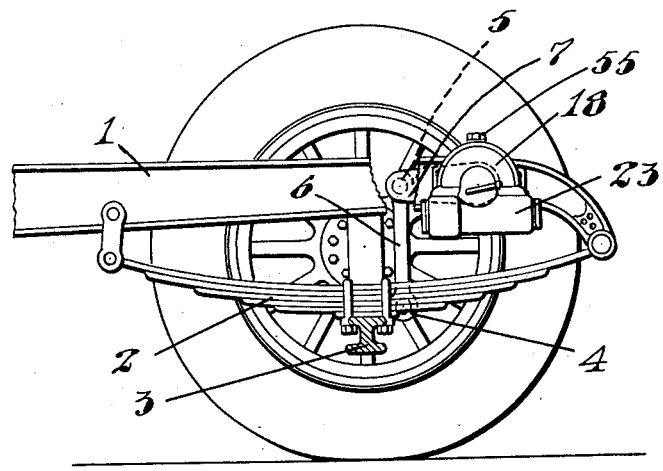
Figure 2:
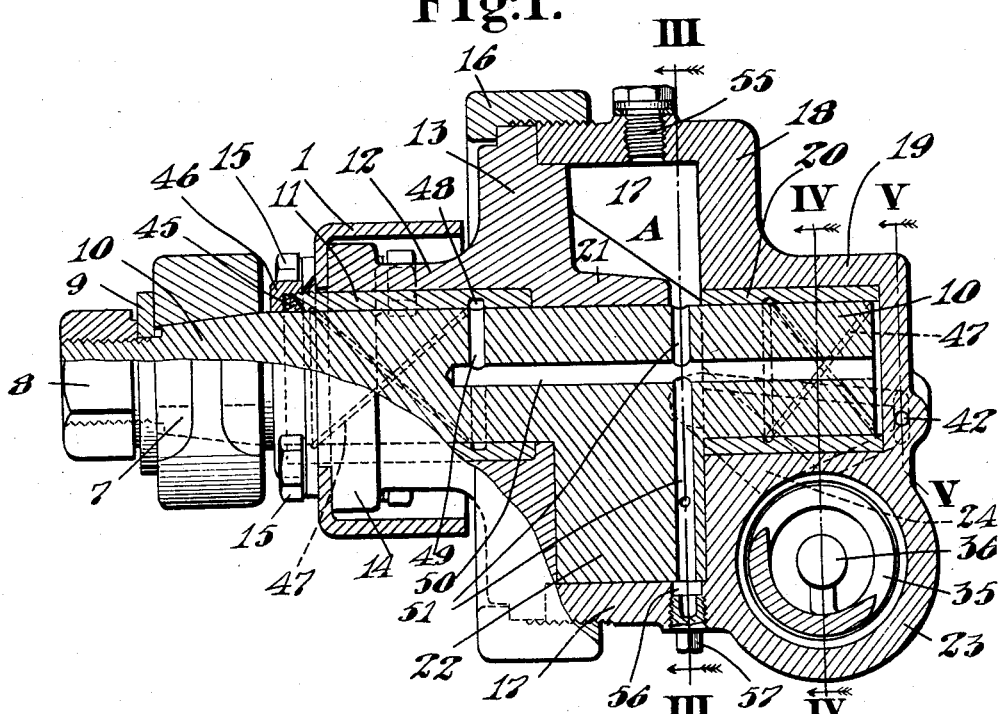
Figure 3:
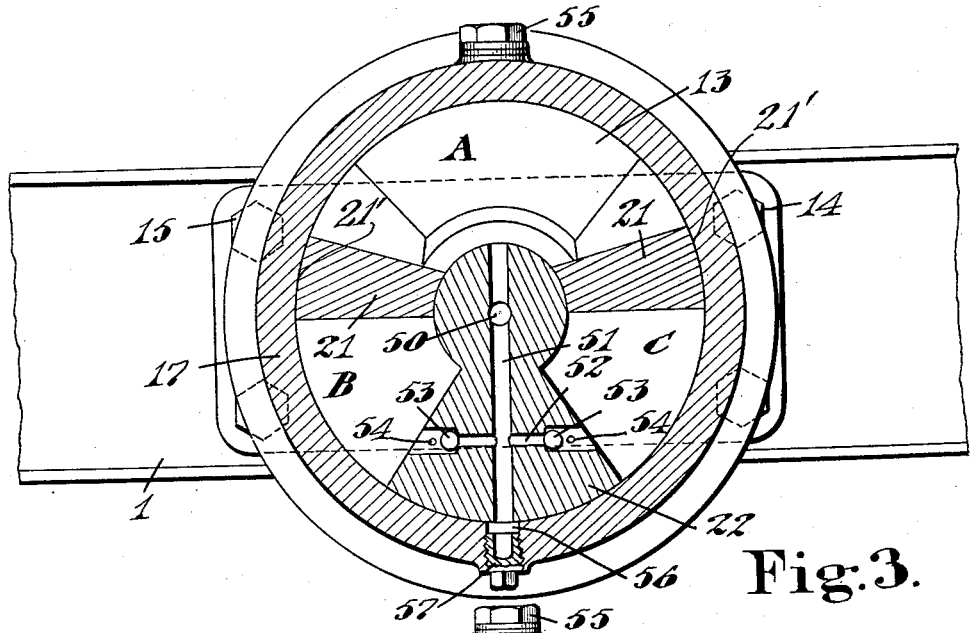
Figure 4:
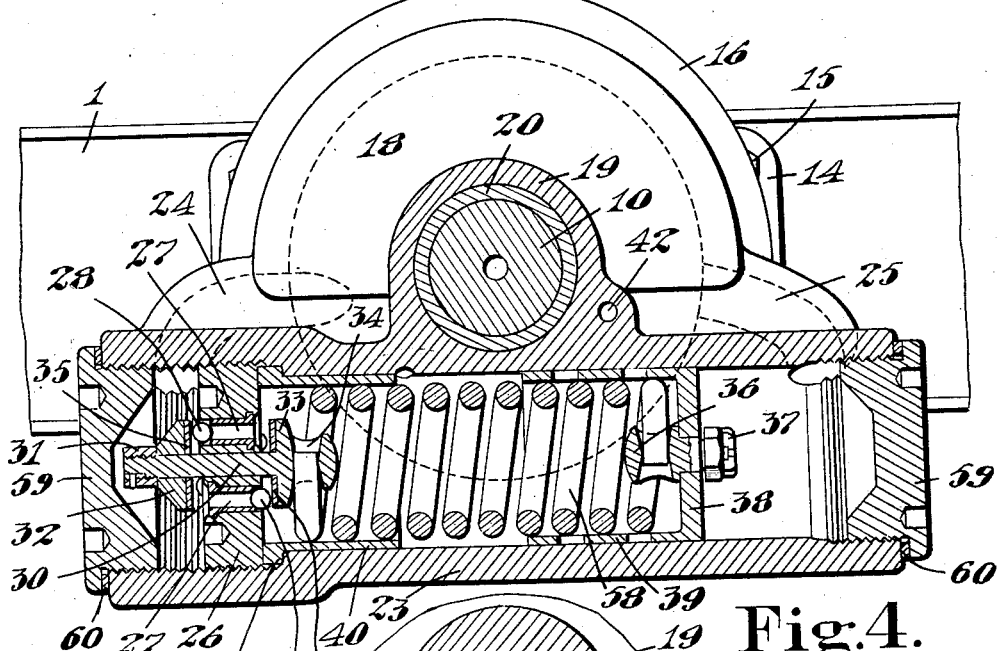
Figure 5:
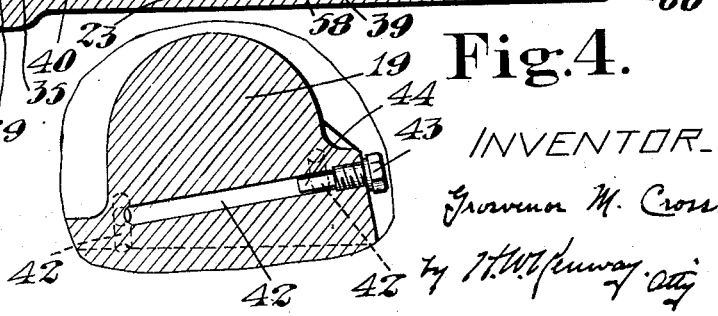

These and other features of the invention will be best understood and appreciated from the following description of a preferred embodiment thereof, selected for purposes of illustration and shown in the accompanying drawings, in which Fig. 1 is a view in elevation showing one possible mounting of the device on a vehicle;

Fig. 2 is a view in longitudinal section through the shock absorber;

Figs. 3, 4 and 5 are views in transverse section on the lines 3—3, 4—4 and 5—5 respectively, of Fig. 2.

A conventional frame 1, spring 2 and axle 3 of a motor vehicle is shown. By suitable connections 4 and 5, a link 6 joins axle 3 with crank arm 7. The other end of arm 7 is firmly attached by means of nut 8 and washer 9 to the tapered and suitably keyed end of shaft 10. Shaft 10 is rotatably journaled in bushing 11 mounted in the thick tubular section 12 projecting from one face of the thick disk-shaped casing cover generally designated 13. Section 12 of casing cover 13 terminates in a flat mounting flange 14 which is attached by suitable bolts 15 to the inside of frame 1 of the vehicle. A large hole is cut in frame 1, through which shaft 10 passes to the above-mentioned connection on the outside thereof, to arm 7.

Casing cover 13 is firmly held, by means of nut 16, to the open face of a shallow cylindrical portion 17 of casing 18, thus forming a closed shallow cylinder therewith. Coaxial with portion 17 of casing 18 and opposite to the open face thereof is formed the hollow cylindrical boss 19, containing the bushing 20, in which is rotatably journaled the inner end of shaft 10.

Integral with the disk-shaped portion of cover 13 is formed pressure wall 21, which extends completely across cylindrical portion 17 of casing 18, making a substantially tight joint with its walls and end and dividing it into two portions: reservoir A and the working chambers B—C, as will later be described. The central portion of wall 21 is bored to the same diameter as journals 11 and 20, so that shaft 10 makes a substantially fluid-tight joint therewith. Projecting from shaft 10 and completely closing one radial portion of the lower chamber of portion 17 of casing 18, is mounted the piston 22. It will thus be seen that by means of shaft 10, wall 21 and piston 22, portion 17 of casing 18 is divided into three chambers: chamber A, located uppermost and unaffected by motion of shaft 10; and chambers B and C, whose volume varies inversely to each other, with rotation of shaft 10 and piston 22.

Formed with its axis transverse to and below that of cylinder 17, is a cylindrical portion 23 of casing 18, henceforth referred to as cylinder 23. Cylinder 23 is closed at each end by plugs 59 seating against washers 60. The ends of cylinder 23 are connected to chambers B and C by passages 24 and 25, respectively. It will be seen that by this construction, when the shock absorber is filled with oil and shaft 10 is rocked, as it will be when the body and axle of the vehicle change their relative positions, piston 22 will be rotated and oil flow will take place from chambers B and C to the cylinder, or vice versa, through passages 24 and 25; and likewise that fluid pressure either in B or C will result in mechanical pressure between body and axle, the direction of pressure, whether forcing body and axle together or apart, depending on which chamber is under pressure.

Near one end of cylinder 23 and between passages 24 and 25 is firmly attached, as by threads, valve block 26 containing hollow valve bushings 27. Bushings 27 which act as ports through valve block 26 and which are shown as held in place by riveting over a shoulder at one end thereof, are arranged with their axes parallel to that of cylinder 23 and equally spaced about a circle whose center is on the axis of cylinder 23. There are preferably an even number of these bushings. Closing one end of each of these bushings 27 is a valve ball 28 or 29, these balls being arranged over alternate bushings, half of the total number being on one side of block 26 and half on the other; those on the left side in the drawings being designated 28 and those on the right 29.

Valve block 26 is drilled axially to receive a slidable rod 30 which is threaded at its end to receive the adjusting nut 31, which is adapted to retain in position the slidable flange 32 mounted on rod 30. The other end of rod 30 is flanged at 33 beyond which is formed a boss 34. On rod 30 and seated against flanges 32 and 33 are placed pressure washers 35, arranged to bear against balls 28 and 29 when forced thereagainst by flanges 32 and 33.

Attached to boss 34 of rod 30 is one end of a control spring 58, contained in and coaxial with cylinder 23. At its other end, by means of stud 36 and nut 37, spring 58 is attached to piston 38 slidable within the cylinder. Spring 58 is loosely held laterally by the walls 39 of piston 38 and by spacing ring 40, which is held in place against shoulder 41 of cylinder 23 by valve block 26. The spring 58 and its connections at 34 and 36 may for convenience be termed a spring assembly.

Nut 31 is ordinarily adjusted on rod 30 loosely enough so that some clearance is allowed between washers 35 and balls 28 and 29, allowing rod 30 a slight longitudinal travel and thus permitting an alternate pressure on balls 28 and 29.

From the top of cylinder 23, in that portion between piston 38 and valve block 26, drilled passages 42 interconnect and terminate in chamber C, which is the pressure chamber hydraulically connected to the other side of piston 38 from that from which these passages originate, as indicated. One of these passages is drilled to the exterior of the device and is closed by screw 43, formed at its inner end into a gauge plug 44 which partially closes the passage 42. It will be seen that this construction forms in effect a by-pass of variable aperture around piston 38, the size of aperture depending on the size of gauge plug 44. The piston 38 works in the end of the cylinder 23 with a dash-pot effect relative to the piston 22 and is controlled in such dash-pot movement by the size of the gauge plug 44 in the passage 42.

At the outer end of bushing 11, around shaft 10, is placed an oil-retaining washer 45, held in place by ring 46 which is threaded to fit bushing 11. Suitable oil grooves 47 are provided in journals 11 and 20. Near the inner end of journal 11 is provided the large groove 48. Radial drilled passage 49 connects groove 48 with axial passage 50 in shaft 10. Transverse drilled passage 51 connects passage 50 with reservoir chamber A and with drilled passage 52 which runs from face to face of piston 22. At each end passage 52 is enlarged to receive check ball 53, held loosely in place by stop pins 54. It will be seen that by this construction all high fluid pressure is removed from washer 45 since groove 48 completely encircles shaft 10, and all high pressure leakage which might occur in operation is immediately passed through passages 49, 50 and 51 to reservoir A, which is under atmospheric pressure only. It will also be seen that all passages are so arranged that gas or air accumulating from any cause in any chamber of the instrument will rise into chambers B or C. This rise takes place through passage 25 from the portion of cylinder 23 to the right of piston 38, through drilled passages 42 from the portion between piston 38 and valve block 26, and through passage 24 from the portion to the left of valve block 26. In chambers B and C this accumulated gas or air lies at the top against partition 21 and, as these chambers are subjected to high pressures in operation, this air is forced through the small clearance space at 21' between partition 21 and the walls of cylinder 17 up into reservoir A, where it rises to the top. To replace this and all other leakage, fluid is drawn from reservoir A through passages 51 and 52 past balls 53, which act to prevent return of fluid in the opposite direction, and so into the operating chambers.

A filler hole and plug 55 is provided in the top of reservoir chamber A, while a sump hole 56, closed by pipe plug 57, is provided at the bottom of the casing in order to pocket any foreign substances in the fluid.

The operation will be explained as for a device mounted and viewed as in the drawings.

A given load is in the vehicle, the parts of the neutralizer are arranged substantially as shown; piston 38 is in such a position that spring 58 exerts no pressure, through rod 30, flanges 32 and 33, and washers 35, against valve balls 28 and 29; if it were not in such a position there would be spring pressure against it, which would force fluid through by-pass passages 42 until the condition of zero spring stress were secured.

The vehicle, moving, strikes a rise in the roadway. Arm 7 is forced upwardly, rotating shaft 10 and piston 22 in a clockwise direction. Fluid is forced from chamber B through passage 24 and past the balls 29 of valve block 26 into the cylinder chamber containing the spring 58. As the stroke proceeds, piston 38 is forced to the right, placing spring 58 under tension and thus, through rod 30, nut 31, flange 32 and washer 35, exerting pressure against balls 28 but leaving balls 29 even more free to allow oil passage. While the spring 58 is relatively heavy and so resists this passage of fluid into the spring chamber, it has a mechanical advantage with reference to the axle which is so slight that its effect is not greater than a few pounds at the maximum deflection of the vehicle spring. Also, during this movement fluid is forced by the piston 38 through the passage 25 into the chamber C.

When the road rise is past, and the axle tends to separate from the body, piston 22 tends to reverse its direction and fluid flow must take place from chamber C, through passage 25 into the cylinder chamber at the right of the piston 38 (Fig. 4). The pressure of this flow against piston 38 causes increased fluid pressure within the cylinder chamber of spring 58 which increased pressure acting against the balls 29 immediately seats these balls and prevents flow through their passages 27; hence if fluid is to flow back to chamber B it must unseat balls 28, now under pressure due to the tension of spring 58 caused by the volume of fluid stored in the spring 58 chamber. When the fluid pressure reaches a height sufficient to overcome this tension, flow will take place but the fluid between the valve block 26 and the piston 38 will throughout be subjected to a pressure determined by the tension of spring 58. As the passages are of ample size, this pressure will be substantially irrespective of the rate of fluid flow. As the stroke continues, tension of spring 58 grows less, due to the movement of piston 38 to the left with the flow of fluid, until the normal point is reached, when the tension becomes zero. It is thus seen that, since pressure in chamber C results in force between body and axle, during this return stroke the movement between body and axle is opposed with a force proportional to the quantity of displaced fluid within the instrument at all points, and hence substantially to the amount by which the body and axle are displaced from normal. The first movement of the body and axle toward each other is, therefore, quite free, being checked mainly by the tensioning of the spring 58, but the rebound or return movement thereof back to the normal is very substantially but smoothly checked by the required unseating of the balls 28 against the action of the spring 58 as described.

This action takes place in a relatively short space of time, in which only a very little fluid is by-passed through passages 42; hence at the end of the action piston 38 returns to substantially the same position as it occupied at the beginning.

When the vehicle wheel encounters a depression in the road, an exactly parallel but opposite action is obtained. There is a counterclockwise movement of piston 22; fluid passes from chamber C, through passage 25 and into the cylinder 23, carrying piston 38 to the left as it flows. Spring 58 is compressed; fluid flows freely past balls 28, which are free to leave their seats, and there is no impediment to the motion. On the return stroke, however, as the fluid flows in the opposite direction, balls 28 are carried quickly into their seats and the flow is opposed by the pressure of spring 58 against balls 29, which must be overcome before piston 22 can return again to its original position. Hence, this return stroke is opposed at all times by a force proportional to the deflection of spring 58 and hence to the movement of piston 38 and to the total volume of fluid flow; which is in turn substantially proportional to the degree of deflection of body and axle from their normal relative positions.

It is evident that as long as a vehicle continues to run on the surface of the ground, the sum of the upward forces on its body must be equal to the sum of the downward forces, even over a period of comparatively short time. Hence, if piston 38 is in a position of zero stress on spring 58 when body and axle are at their normal separation, then the sum of successive tensions on spring 58, which correspond to increase in upward force under the body, will be equal to the sum of successive compressions, which correspond to diminutions of force under the body; the very small flow through passages 42 in one direction will, therefore, be compensated for by an exactly equal flow in the opposite direction, and piston 38 will be maintained in this position relative to piston 22.

If, however, the normal point of the vehicle does not correspond with the non-stress point of piston 38, which condition will obtain, for example, when there is shift of load in the vehicle, which naturally changes the normal riding point of the body, then spring 58 is unevenly stressed—either compressive or tensioning forces are the stronger, with the result that there is a difference in average pressure between the two sides of piston 38. Therefore, flow in opposite directions through passages 42 will be unequal and will remain so until piston 38 has again reached such a position relative to the fluid impelled by piston 22 that its zero stress position corresponds to the normal relative position of body and axle. At this point the action of the device will again be as described above and thus the changes due to alteration of load will be automatically compensated for.

I have described the invention in this embodiment, as I consider that it is one of the best; but I do not wish to be limited to this one form as there are many other possible applications of the mechanical principles included in the scope of this invention.

Having thus described my invention, what I claim as new and desire to secure by Letters Patent is:

1. A spring reaction neutralizer having, in combination, two members having a limited relative movement, a fluid-containing element rigidly connected to one them, a fluid-actuating element connected to the other and to the first element and being so constructed and arranged that motion between said members causes fluid flow within the first element, and an element including a valve, a spring, and a spring-stressing member, said valve allowing free flow of fluid in one direction but opposing flow in the other direction when said spring is stressed, said spring-stressing member being actuated by said fluid flow.

2. A spring reaction neutralizer having, in combination, two members having a limited relative movement, a fluid-containing element connected to one of them, a fluid-actuating element connected to the other and to the first element and being so constructed and arranged that motion between said members causes fluid flow within the first element, and a fluid-controlling element including a valve, a spring and a member governing the stresses of said spring, said valve allowing free passage of fluid in one direction but opposing it in the other direction when said spring is placed under compression, the directions of free and opposed fluid flow through said valve being reversed when said spring is placed under tension, and said spring-governing member being actuated by the flow of fluid within said containing element.

3. A hydraulic spring reaction neutralizer adapted to be connected between the body and axle members of a vehicle, and consisting of a fluid-containing element and a fluid-actuating element so connected that relative movement between body and axle members results in fluid flow within said containing element, and a fluid-controlling element including a valve member, a spring member, and a spring-stressing member connected to the spring, said fluid flow determining the position of said spring-stressing member within said fluid-containing element, the position of said spring-stressing member determining the force exerted by said spring, and the force of said spring determining the pressure exerted on said fluid by said valve.

4. A hydraulic spring reaction neutralizer adapted to be connected between body and axle members of a vehicle and consisting of a fluid-containing element and a fluid-actuating element so connected that relative movement between body and axle members in one direction results in fluid flow in one direction within said containing element, and relative movement in the other direction results in fluid flow in the opposite direction within said containing element, and a fluid-controlling element including a valve assembly and spring means actuating said valve assembly and a moving closure within said fluid-containing element for actuating said spring means, the direction and extent of movement of said closure being governed by the direction and quantity of said fluid flow and governing, through said spring means, the direction and degree of fluid pressure necessary to produce said flow through said valve assembly.

5. A hydraulic spring reaction neutralizer adapted to be connected between body and axle members of a vehicle and consisting of a fluid-containing element and a fluid-actuating element so connected that relative movement between body and axle members in one direction results in fluid flow in one direction within said containing element, and relative movement in the other direction results in fluid flow in the opposite direction within said containing element, and a fluid-controlling element including a valve assembly and spring means actuating said valve assembly and a moving closure within said fluid-containing element for actuating said spring means, the direction and extent of movement of said closure being governed by the direction and quantity of said fluid flow, the movement of said closure in one direction stressing said spring means in one direction and allowing free fluid flow through said valve assembly in one direction while opposing said flow in the other direction, movement of said closure in the opposite direction resulting in an opposite stress in said spring means and in a corresponding reversal of the directions of free and opposed fluid flow through said valve assembly.

6. A hydraulic spring reaction neutralizer as described in claim 5, including means whereby said closure is maintained in a position at which it exerts zero stress on said spring means when said body and axle members are in their normal average relative positions, irrespective of the load carried by the vehicle.

7. In combination with body and axle members of a vehicle, a hydraulic device connected between said body and axle members, and comprising a cylinder, a piston operable therein and causing by its movement therein a flow of fluid, a second piston within a second cylinder and moved by said fluid flow, a spring stressed by the movement of said second piston, and a valve controlled by said spring and acting to check the flow of said fluid from the second cylinder.

8. A hydraulic spring reaction neutralizer as described in claim 5, in which said valve is composed of two elements, each element allowing fluid flow in but one direction.

9. In a shock absorber for vehicles having body and axle members, means providing a fluid chamber, a piston within a second chamber, said means and piston being connected each to one of said body and axle members, a moving closure in the first chamber, a valve assembly, and spring means associated with said closure and valve assembly and controlling the flow of fluid within said first chamber.

10. In a shock absorber for vehicles, a fluid chamber containing a moving closure in contact only with the walls of said chamber and with a spring assembly, said spring assembly connecting said closure with a valve assembly, and controlling thereby the fluid pressures within said chamber.

11. In a shock absorber for vehicles, a fluid chamber containing a moving closure, a spring assembly connecting said closure with a valve assembly, said valve assembly allowing free flow of fluid in one direction but opposing flow in the other direction when said spring assembly is stressed in one direction, and said valve assembly opposing flow in the first direction while allowing free flow in the second direction when said spring assembly is stressed in the opposite direction, together with a relatively restricted by-pass from one side of said closure to the other.

12. A pressure-controlling mechanism for a hydraulic shock absorber consisting of oppositely-disposed valves in a valve member, each valve acting both as a check valve and as a pressure-determining valve, together with automatically variable means for stressing said valves.

13. In a shock absorber, a valve block closing a passage to fluid flow, valves disposed on each side of said block, each valve closing a single port through said block and preventing fluid flow therethrough in one direction, together with means for stressing said valves to control the pressure exerted thereby against fluid flow in the opposite direction, said means acting to stress the valves on one side only of the block at a time.

14. A valve assembly in a hydraulic shock absorber comprising valves oppositely disposed in a passage of fluid flow, each of said valves adapted to exert a pressure on said fluid when flowing past said valve, said pressure being determined by the degree of deflection of a spring connecting said valve assembly with a moving closure in said passage of fluid flow, the spring normally being in neutral position and being adapted to be deflected by fluid pressure.

15. In combination with the body and axle members of a vehicle, a shock obsorber containing oppositely-disposed valves in a fluid-containing passage, each of said valves being adapted to check the flow of said fluid in one direction and to allow it in the other direction, an element adapted to exert pressures on said valves, spring means connected to said element and to a moving closure in said fluid-containing passage, and a restricted by-pass from one side to the other of said closure.

16. A valve assembly in a hydraulic spring reaction neutralizer consisting of a valve block with a plurality of parallel passages therethrough, balls adapted to close said passages at one end only, half said passages being closed on one side of said block and half on the other, a rod slidably mounted in said block, its axis parallel to said passages, said rod having shoulders at each end adapted to distribute pressure on said balls, together with means for connecting said rod to a spring.

17. A valve assembly as described in claim 16, together with a spring connected thereto and to a piston freely movable in a fluid-filled chamber, a by-pass from one side to the other of said piston, a cylinder hydraulically connected with said chamber, and a second piston contained in said cylinder.

18. In a shock absorber, a fluid-containing chamber, an externally-actuated piston causing a flow of fluid in said chamber, a second piston deriving motion from said flow and controlling, through spring means, a valve determining at all times the pressure on said fluid, together with a restricted by-pass from one side of said second piston to the other.

19. In a reaction neutralizer, a fluid-containing chamber, an externally-actuated piston adapted to cause a flow of fluid therein, a second piston deriving movement from said flow and controlling by said movement the pressure of spring means on a valve element, said valve element allowing said fluid flow to be unimpeded in one direction but opposing said fluid flow in the other direction when said spring means is stressed in one direction, the direction of unimpeded and opposed flow being reversed when said spring means is stressed in the other direction, together with means adapted to maintain said chamber filled with fluid, and to remove therefrom any accumulations of gas or air.

20. In combination, a vehicle having body and axle members, a fluid-containing casing connected to one of said members, a shaft mounted in said casing and operatively connected at its inner end to a piston adapted to cause a flow of fluid in said casing, said shaft being operatively connected at its outer end to the other of said body and axle members, a second piston actuated by said flow of fluid and controlling the pressures on fluid, a packing gland mounted within said casing and circumscribing a portion of said shaft, a fluid chamber between said packing gland and the interior of said casing, together with means for maintaining at a substantially constant value the hydraulic pressure within said fluid chamber.

21. In combination, a vehicle having body and axle members, a cylinder connected to one of said members, a journal adjacent to said cylinder, a shaft adapted to rotate therein and connected at its inner end to a piston in a slidable engagement with the walls of said cylinder, said shaft being operatively connected at its outer end to the other of said body and axle members, a fluid contained in said cylinder and adapted to be displaced by movement of said piston therein, a second piston deriving motion from said fluid displacement, spring means connecting said second piston with a controlling element of oppositely-disposed valves, a packing gland adapted to prevent fluid flow between said journal and said shaft, a chamber disposed between said packing gland and said cylinder, together with a fluid reservoir hydraulically connected with said chamber and also through check valve means with said cylinder.

22. In a hydraulic shock absorber containing passages for fluid flow, a controlling element actuated by the volume of fluid flow, a cylinder, a radial piston in slidable engagement therewith, a shaft integral with said piston, a journal supporting said shaft and disposed relatively to said cylinder to permit said slidable engagement between said piston and said cylinder, a packing gland disposed in said journal to prevent fluid leakage between said shaft and said journal, an annular chamber disposed around said shaft between said packing and said cylinder, a fluid reservoir, passages in said shaft connecting said chamber with said reservoir, and passages in said shaft and said piston connecting said reservoir with said cylinder, said latter-named passages being so valved that fluid is allowed to flow from said reservoir to said cylinder but not in the reverse direction.

23. A shock absorber as described in claim 22, in which said controlling element is comprised of a free moving piston, a restricted by-pass from one side to the other thereof, and spring means connecting said free moving piston to a valve assembly containing oppositely-disposed valves.

24. A hydraulic reaction neutralizer containing three chambers, first of said chambers being adapted for storing a fluid and supplying thereof to the other chambers, second of said chambers containing elements adapted to convert mechanical energy into fluid force and movement, and vice versa, third of said chambers containing elements adapted to control said fluid force, said latter-named elements comprising a moving closure in said third chamber, spring means connected thereto and to a valve, and a restricted by-pass from one side to the other of said closure, together with hydraulically operative passages connecting said three chambers.

25. A vehicle consisting of body and axle members with a yielding connection between them, a cylinder closed at both its ends and adapted to be connected to one of said members, radial partitions dividing said cylinder into a reservoir chamber and a pressure chamber, axial extensions of said cylinder, a shaft journaled in said extensions and extending beyond one of same, a piston integral with said shaft and adapted to rotate through a limited arc within said pressure chamber, a link and crank arm connecting the outer end of said shaft with the other of said body and axle members, a second cylinder closed at both ends, passages connecting opposite ends of said second cylinder with portions of said pressure chamber on opposite sides of said piston, a second piston slidably mounted in said second cylinder, spring means connected thereto and to a system of oppositely-disposed valves, and a restricted by-pass from one side to the other of said second piston.

26. A shock absorber as described in claim 25, comprising in addition a packing ring held between said shaft and one of said cylinder extensions, an annular groove circumscribing said shaft between said packing and said chambers, passages connecting said groove with said reservoir chamber, and one-way passages connecting said reservoir chamber with said pressure chamber, said oppositely-disposed valves being disposed on each side of a valve block closing said second cylinder, and each of said valves closing a single port through said block.

27. A hydraulic spring reaction neutralizer as described in claim 5, including means whereby said closure is maintained in a position at which it exerts zero stress on said spring means when said body and axle members are in their normal average relative positions, irrespective of the load carried by the vehicle, in which the closure positioning means comprises a by-pass from one side to the other of said closure.

28. A shock absorber as described in claim 22, in which said controlling element is comprised of a free moving piston, a restricted by-pass from one side to the other thereof, and spring means connecting said free moving piston to a valve assembly containing oppositely-disposed valves, in which said reservoir is further connected to said cylinder by restricted passages adapted to remove accumulations of gas or air therefrom.

29. A shock absorber for a vehicle, comprising a fluid-filled cylinder, radial partitions in said cylinder dividing it into two chambers, one of which is adapted to be used as a fluid reservoir, a shaft journalled to move about an axis corresponding to the axis of said cylinder, a piston integral with said shaft and in slidable engagement with a wall of the other chamber of said cylinder, together with a third chamber connected by fluid passages with said chamber containing said piston, said third chamber containing associated control members consisting of a moving closure, spring means and a valve assembly, said valve assembly consisting of oppositely-disposed valves stressed in alternate directions by said spring means, and a restricted by-pass being provided from one side to the other of said closure.

30. A shock absorber as described in claim 29, including a bushing on said shaft, an annular groove about said shaft beneath said bushing, and passages connecting said groove with said reservoir chamber.

31. A spring reaction neutralizer having, in combination, a vehicle and axle having a limited relative movement, a fluid-containing element rigidly connected to one of them, a fluid-actuating element connected to the other and to the first element and being so constructed and arranged that motion between said members causes fluid flow within the first-named element, fluid flow controlling mechanism including a valve, a spring, and a spring stressing member, said valve controlling the fluid flow when the spring is stressed, and means providing a dash-pot effect between said spring stressing member and the fluid-actuating element.

GROSVENOR M. CROSS.